US008429643B2

(12) United States Patent
Venkatachalam et al.

(10) Patent No.: US 8,429,643 B2
(45) Date of Patent: Apr. 23, 2013

(54) SECURE UPGRADE OF FIRMWARE UPDATE IN CONSTRAINED MEMORY (75) Inventors: Rajagopal Venkatachalam, Redmond, WA (US); Zhangwei Xu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1324 days.

(21) Appl. No.: 11/850,118

(22) Filed: Sep. 5, 2007

(65) Prior Publication Data

US 2009/0064125 A1  Mar. 5, 2009

(51) Int. Cl.
G06F 9/44 (2006.01)

(52) U.S. Cl.
USPC .......................................................... 717/173

(58) Field of Classification Search ........................ None
See application file for complete search history.

(56) References Cited

U.S. PATENT DOCUMENTS

| | | | |
|---|---|---|---|
| 6,748,380 B2 * | 6/2004 | Poole et al. ................. | 717/174 |
| 6,930,785 B1 | 8/2005 | Weyand et al. | |
| 6,990,577 B2 | 1/2006 | Autry | |
| 7,017,004 B1 * | 3/2006 | Calligaro et al. ............ | 711/102 |
| 7,069,452 B1 | 6/2006 | Hind et al. | |
| 7,089,547 B2 | 8/2006 | Goodman et al. | |
| 7,095,858 B2 | 8/2006 | Wagner et al. | |
| 7,146,609 B2 | 12/2006 | Thurston et al. | |
| 7,310,520 B2 * | 12/2007 | Kim .............................. | 455/419 |
| 2002/0184224 A1 * | 12/2002 | Haff et al. ................... | 707/10 |
| 2002/0188614 A1 * | 12/2002 | King ........................... | 707/100 |
| 2003/0009752 A1 * | 1/2003 | Gupta .......................... | 717/171 |
| 2004/0034621 A1 * | 2/2004 | Tanaka et al. ................. | 707/1 |
| 2004/0199760 A1 * | 10/2004 | Mazza et al. ................. | 713/150 |
| 2005/0021968 A1 | 1/2005 | Zimmer et al. | |
| 2005/0022057 A1 * | 1/2005 | Takamoto et al. .......... | 714/13 |
| 2005/0055595 A1 * | 3/2005 | Frazer et al. ................. | 713/400 |
| 2005/0182952 A1 * | 8/2005 | Shinozaki .................... | 713/189 |
| 2005/0216753 A1 | 9/2005 | Dailey et al. | |
| 2006/0004756 A1 * | 1/2006 | Peleg et al. .................. | 707/8 |
| 2006/0101454 A1 * | 5/2006 | Whitehead ................... | 717/168 |
| 2006/0143600 A1 | 6/2006 | Cottrell | |
| 2006/0174240 A1 | 8/2006 | Flynn | |
| 2006/0244986 A1 | 11/2006 | Ferlitsch | |
| 2006/0265591 A1 * | 11/2006 | Torrubia et al. ............ | 713/176 |
| 2007/0022420 A1 * | 1/2007 | Yamamoto et al. ......... | 717/177 |
| 2007/0136361 A1 * | 6/2007 | Lee et al. .................... | 707/102 |
| 2007/0198838 A1 * | 8/2007 | Nonaka et al. .............. | 713/176 |
| 2008/0052699 A1 * | 2/2008 | Baker et al. .................. | 717/168 |
| 2008/0091945 A1 * | 4/2008 | Princen et al. ............... | 713/170 |
| 2008/0244553 A1 * | 10/2008 | Cromer et al. ............... | 717/168 |
| 2009/0013405 A1 * | 1/2009 | Schipka ....................... | 726/22 |

* cited by examiner

Primary Examiner — Wei Zhen
Assistant Examiner — Adam R Banes
(74) Attorney, Agent, or Firm — Westman, Champlin & Kelly, P.A.

(57) ABSTRACT

A hardware-based security module may contain executable code used to manage the electronic device in which the security module resides. Because the security module may have limited memory, a memory update process is used that allows individual blocks to be separately downloaded and verified. Verification data is sent in a header block prior to sending the individual data blocks.

20 Claims, 7 Drawing Sheets

SECURE UPGRADE OF FIRMWARE UPDATE IN CONSTRAINED MEMORY

BACKGROUND

Electronic devices that serve as client devices frequently run executable code that corresponds to a host device or service. In some cases, the executable code on the electronic device is one-half of a communication system that requires a known state at both ends. In other cases, a party with an interest in the electronic device, such as a corporate owner of an employee device simply wants to have certain versions of executable code running for synchronization or maintenance purposes.

In such cases, the host device or service may occasionally download a new version of the executable code to the electronic device. There is often a verification process involving a digital signature so that the electronic device can assure itself that the executable code is authentic.

However, when the target electronic device is not a computer, but a sub-system of the computer, memory constraints can place a limit on how large an executable can be and still take advantage of cryptographic authentication because there isn't enough memory overhead to perform the necessary functions.

SUMMARY

A secure memory update process accommodates a small target memory by breaking an update into data blocks and sending individual authentication information about each block in a header file before sending the actual data blocks. The electronic device can verify each block separately without the requirement for the whole update to be in place before verification of a hash or other digital signature. The update can be handled as an atomic transaction, that is, if any block fails to download or verify, the entire update can be rolled back to the previous version.

In some applications the update may be to a secure module that is part of the electronic device. The update may be code executed in the security module or the update may be code executed in the electronic device, that is, executed by the electronic device processor. Such an update may include a basic input/output system (BIOS) that is part of a secure boot process managed by the security module.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
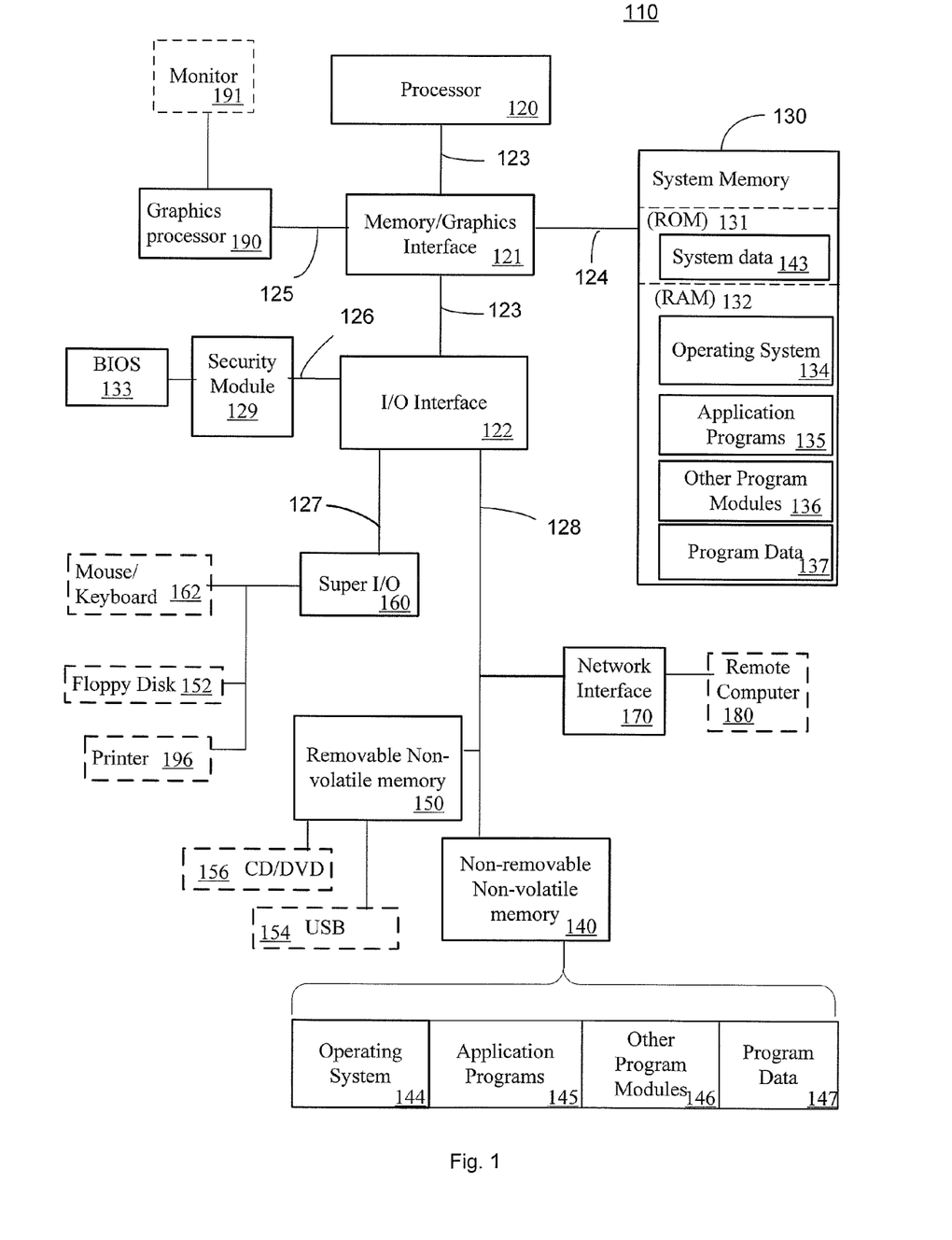
FIG. 1 is a block diagram of a computer adapted to support a secure upgrade.

With reference to FIG. 1, an exemplary electronic device for implementing the claimed method and apparatus may include a general purpose computing device in the form of a computer 110. Components shown in dashed outline are not technically part of the computer 110, but are used to illustrate the exemplary embodiment of FIG. 1. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

In some embodiments, a security module 129 may be incorporated to manage metering, billing, and enforcement of policies. The security module is discussed more below, especially with respect to FIG. 2.

A super input/output chip 160 may be used to connect to a number of 'legacy' peripherals, such as floppy disk 152, keyboard/mouse 162, and printer 196, as examples. The super I/O chip 160 may be connected to the I/O interface 122 with a low pin count (LPC) bus, in some embodiments. The super I/O chip 160 is widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 illustrates a hard disk drive 140 that reads from or writes to non-removable, nonvolatile magnetic media. Removable media, such as a universal serial bus (USB) memory 154 or CD/DVD drive 156 may be connected to the PCI bus 128 directly or through an interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processor 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 1 may include a local area network (LAN), a wide area network (WAN), or both, but may also include other networks. Such networking environments are commonplace in offices, enterprise-wide computer networks, intranets, and the Internet.

In some embodiments, the network interface may use a modem (not depicted) when a broadband connection is not available or is not used. It will be appreciated that the network connection shown is exemplary and other means of establishing a communications link between the computers may be used.

Figure 2:
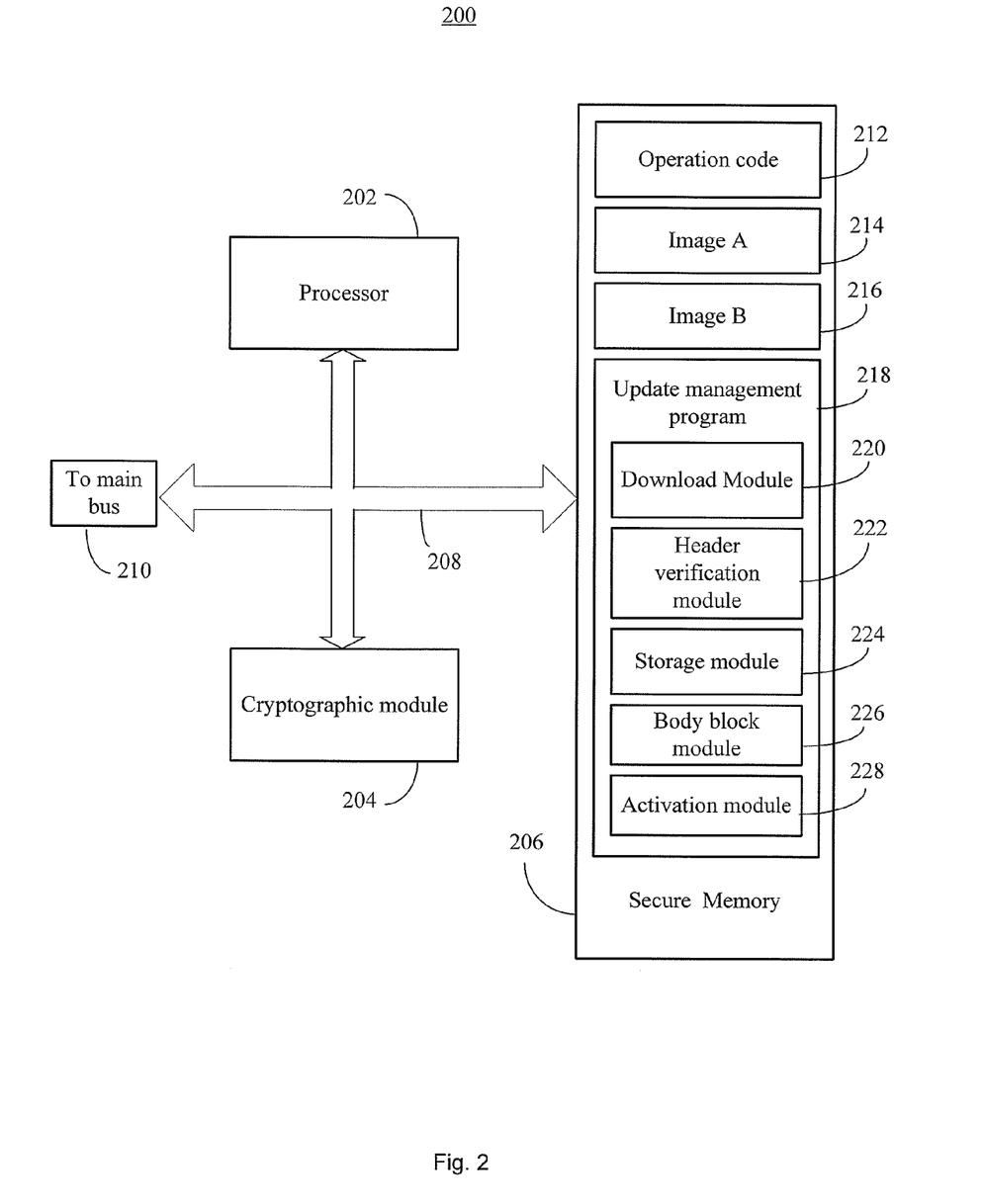
FIG. 2 is a block diagram of a security module.

FIG. 2 is an exemplary security module 200, similar to the security module 129 of FIG. 1. The security module 200 may have a processor 202, a cryptographic module 204, a secure memory 206. Each of these components may be coupled by a bus 208, which may also serve as a port 210 between the security module 200 and other components in a computer, such as computer 110. The processor 202 may be a single chip processor, such as an ARM™ core processor. The cryptographic module 204 may be capable of performing cryptographic functions, such as symmetric and asymmetric encryption and hashing. In an exemplary embodiment, the cryptographic module 204 may be a smart chip, such as are available from STI, Infineon, etc.

The secure memory 206 may include operation code 212, that includes executable code run by the processor 202. The secure memory 206 may also include memory images, such as memory image A 214 and memory image B 216. The memory images 214 and 216 may be used by the computer processor 120 of FIG. 1. In one embodiment, the memory images 214 and 216 may be BIOS executables used when booting the computer 110. Storing BIOS executables in the secure memory 206 allows more secure management of the boot process by making it more difficult for a malicious user to replace the BIOS with an unapproved version.

The secure memory 206 may include an update management program 218 and is shown in greater detail that other programs and utilities that may be included in the operation code 212. In general, the update management program 218 manages the process of receiving a memory update (or update), in small pieces that may be individually verified before being applied to the update. Receiving and verifying small blocks of a full download ease memory requirements in the security module 200, where memory space may be a premium. An exemplary format for an update as transmitted is described in detail in FIGS. 3 and 4.

The update management program 218 may include a download module 220 for receiving update blocks from the port 210 via the bus 208. The download module 220 may include handshaking, link-layer encryption, source verification, etc. The update management program 218 may also include a header verification module 222 for authenticating a header portion of the memory update, a storage module 224 for storing hash values embedded in the header portion, a body block module 226 for receiving a body block portion of the memory update and for comparing a hash of the body block portions with the hash values embedded in the header portion for corresponding body block portions, and an activation module 228 for operating from the memory update when all the update blocks have been received and verified by the body block module 226. The activation module 228 may retain an original memory image for operation if the body block module 226 fails to verify all the update blocks.

Figure 3:
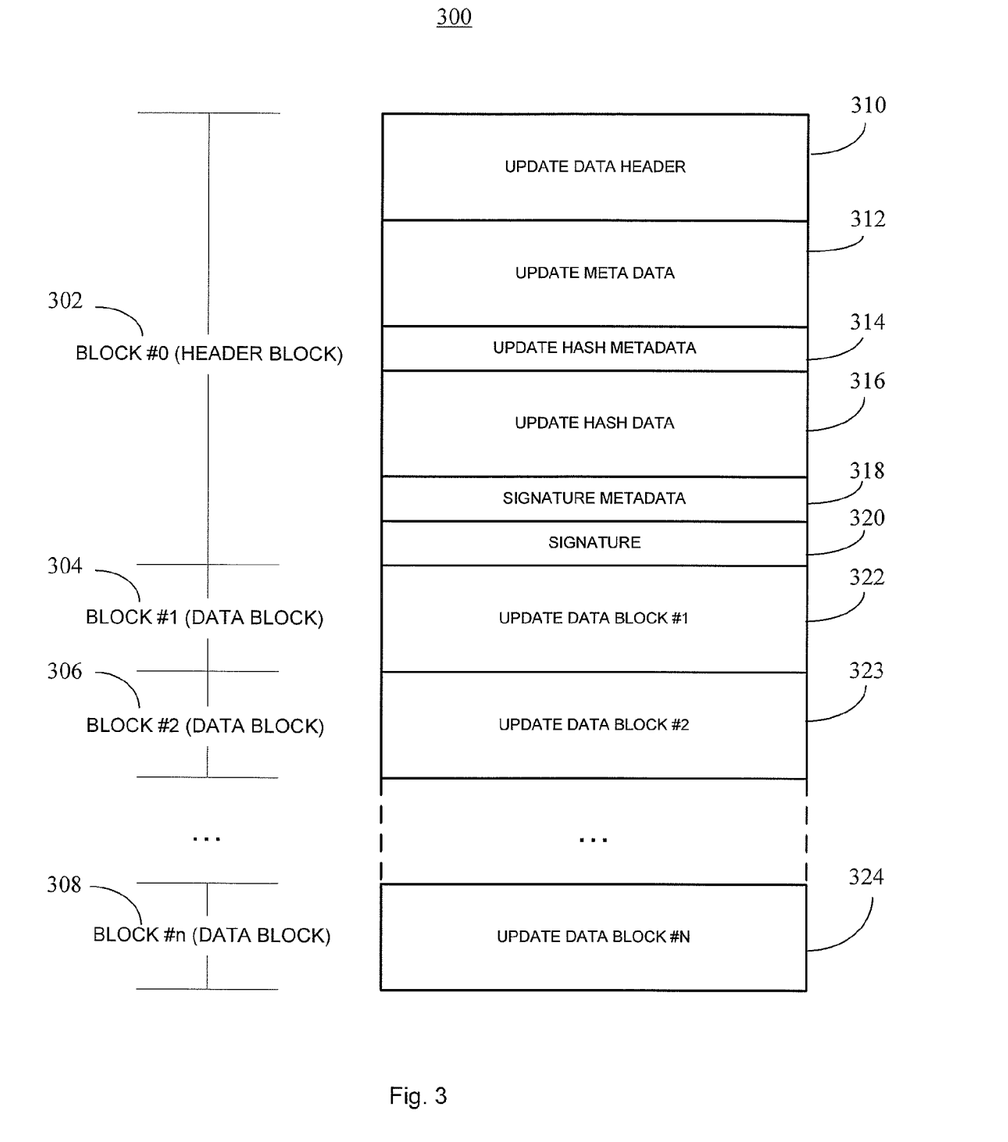
FIG. 3 is a block diagram of an exemplary memory update format.

FIG. 3 illustrates an exemplary memory update format 300. The memory update format 300 may include a header block 302 (block #0) and one or more data blocks 304, 306, 308. The header block 302 may include records, including an update data header record 310, an update metadata record 312, an update hash metadata record 314, an update hash data record 316, a signature metadata record 318, and a signature record 320. In operation, each block may received and processed individually at the security module 200. An exemplary embodiment illustrating sample fields for each record of the header block 302 is shown in FIG. 4.

Figure 4:
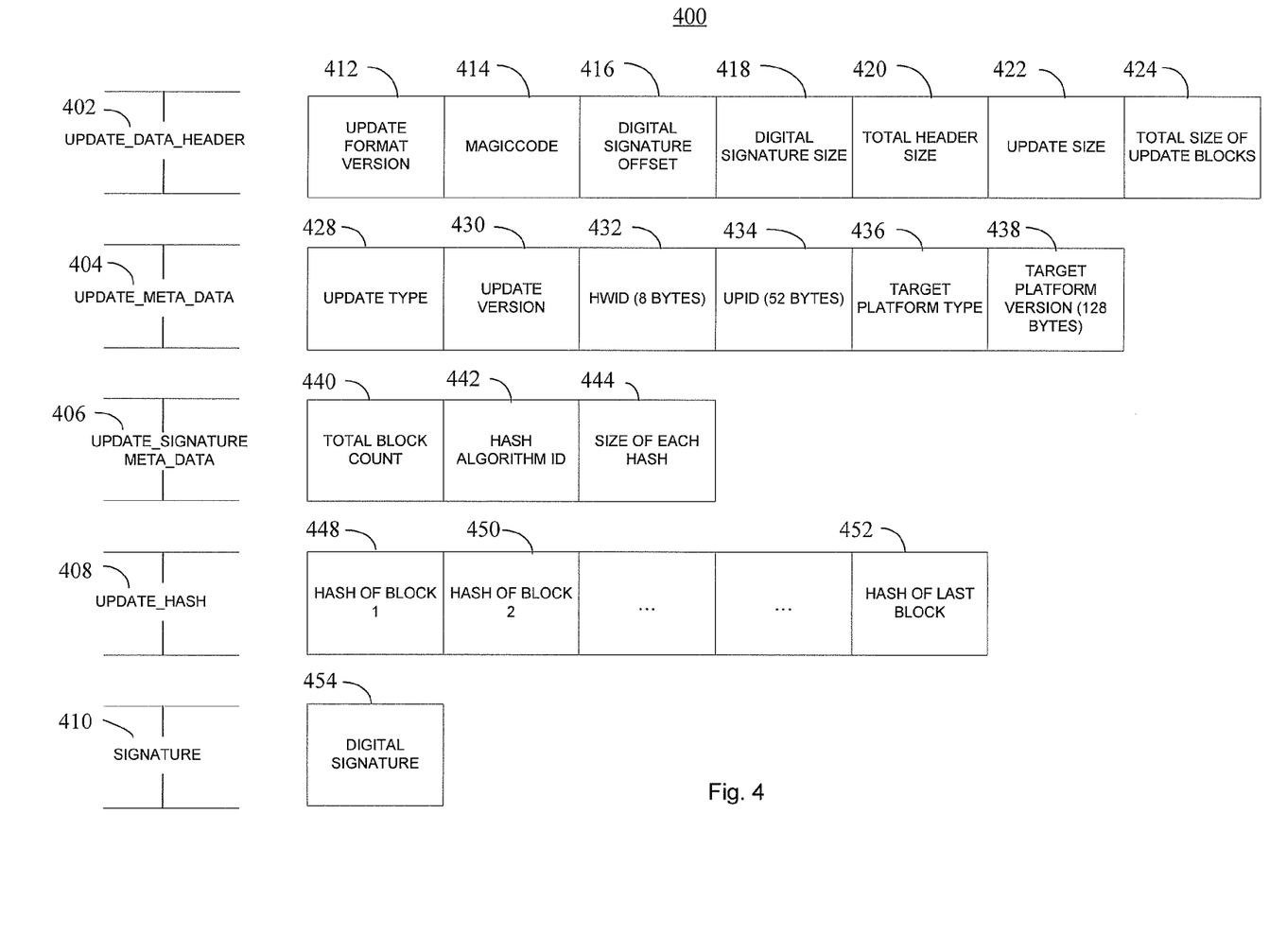
FIG. 4 is a block diagram showing exemplary fields of the records of the header of the update format of FIG. 3.

FIG. 4 shows possible fields for each of the records of a header block 400, similar to the header block 302 of FIG. 3. The update header may include records as described above, for example, an update data header record 402, an update metadata record 404, an update signature metadata record 406, an update hash 408, and a signature record 410.

The update data header 402 or update data header record may include an update format version number 412, a code related to status or magic code 414, an digital signature offset 416, a digital signature size 418, a total header size 420, an update size 422, and a total size 424 the update blocks 322, 324, 326. The update format version 412 may be an indicator for the version of the update block format. The offset to the digital signature 416 may be the number of bytes of data from the beginning of the header 400 to the beginning of the digital signature field 410.

The update metadata record 404 may have data fields that include an update type field 428, an update version field 430, a hardware identifier 432, a universal product identifier field 434 (UPID), a target platform type field 436, and a target platform version field 438. The update type 428 may include data about the nature of the update, for example, a BIOS update or an operation code 212 update. The update version 430 may be a version number for the current update and act like a sequence number so that the same version is not reinstalled. The hardware identifier 432 may be a machine-specific identifier. The UPID 434 may be a type of service or business offering supported on a pay-per-use or subscription basis. For example, one UPID value may relate to hardware services and another UPID value may relate to an operating system or application program. A combination of hardware identifier 432 and UPID 434 may be used to uniquely identify any number of products and services on an individual computer 110 or other electronic device (not depicted). The target platform type 436 may be an identifier for a computer brand, model, etc. Similarly, the target platform version 438 may be an indicator of what release level or serial number range the current update applies to.

The update signature metadata record 406 may include a block count field 440, a hash algorithm identifier field 442, and hash size field 444. The total block count 440 may be a record that gives the total number of data blocks that follow the header block 400 as part of the update. The hash algorithm identifier 442 gives the type of hash algorithm used, for example, a SHA-256 algorithm. If not inherent in the algorithm type, block 444 may be used to designate the size of each hash.

The update hash data record 408 may include a hash field for each update block, e.g. blocks 322, 323, 324 of FIG. 3. For example, the hash of block 1 448 may correspond to block 322, the hash of block 2 450 to block 323, and so forth, with the hash of the last block 452 corresponding to block 324.

The update signature record 410 may include a single field with the digital signature 454 of the header 400. The header 400 does not necessarily contain any proprietary or secret information, so a signature may be sufficient security as opposed to both encrypting and signing the header 400. However, in some embodiments encryption may be desired in place of or in addition to signing.

The header verification module 222 may parse the header portion into records that may include an update data header record, an update metadata record, an update signature metadata record, a hash data record, and a signature record.

Figure 5:
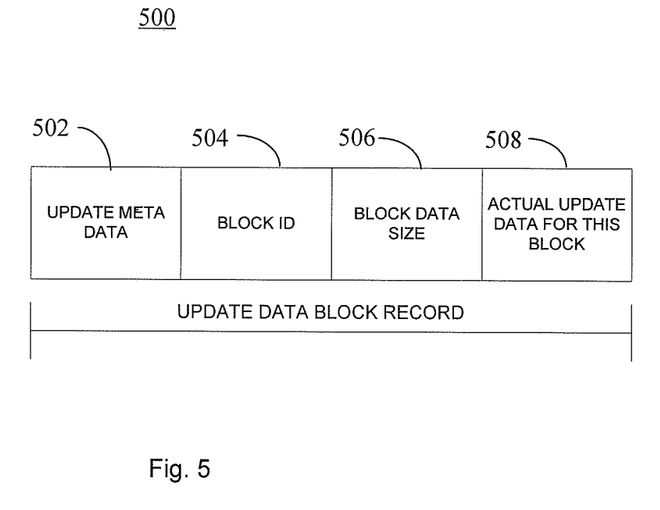
FIG. 5 is a block diagram showing exemplary fields of a data block of the update format of FIG. 3.

FIG. 5 illustrates a representative update data block record 500. The data record may be one of many data block records, as illustrated in FIG. 3. The representative data block record 500 may include an update metadata record 502, a block identifier field 504, a block data size field 506, and a body block 508 or data block field, containing the actual update data. The update metadata field 502 may include a sequence number or update version number (such as data from the update version field 430 of FIG. 4) so that data blocks from other updates are distinguishable from data blocks of the current update. The block identifier field 504 may include a block number so blocks that arrive out of sequence can be correctly stored. The block data size field 506 can be used for memory allocation.

Figure 6:
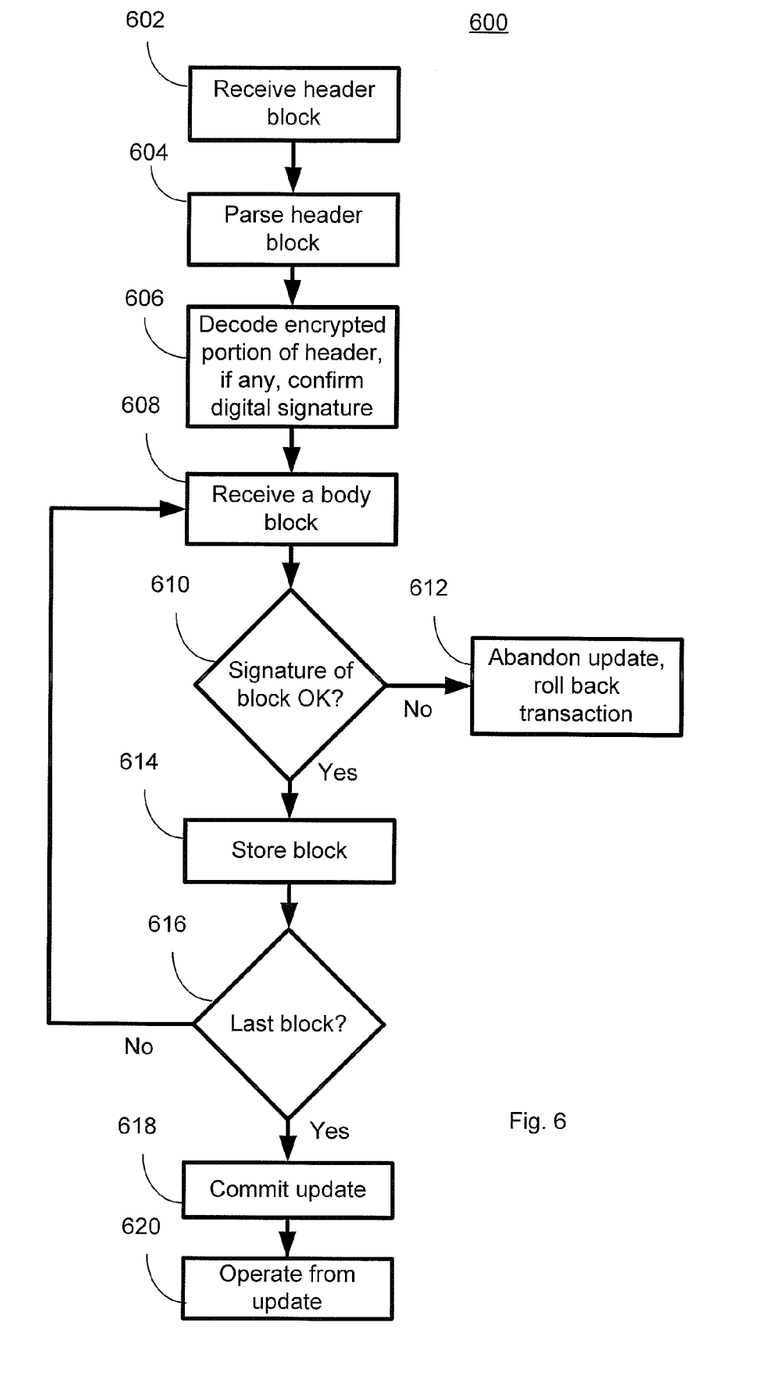
FIG. 6 is a method of receiving and storing a memory update.

FIG. 6 illustrates a method 600 of securely downloading an update to a constrained memory. The update may be an updated basic input/output system (BIOS) image used for booting a computer, such as computer 110 of FIG. 1 or may be an update to a component of the computer 110, such as security module 129.

At block 602, the security module 129 or other electronic device (not depicted) may receive a header block of the update. At block 604, the header block may be parsed into records and then to fields, or may be parsed directly to fields. Exemplary records and fields were discussed above with respect to FIGS. 3-5.

At block 606, any encrypted portion or portions of the header block may be decoded and a header digital signature 454 of at least a portion of the header block may be confirmed. The records of the header may include an update data record having a format version, an identifier, a signature size, a signature offset, an update size, and a body block size. Another header record may be an update metadata record including an update type, an update version, a hardware identifier, a universal product identifier, and a target type. A signature metadata record may include a total count of body blocks, and a size of each body block. An update signature record may include signature data for each body block. The signature is often a simple hash of a corresponding data block. Since a SHA-256 hash is only 256 bits of data, a number of signatures can be accommodated in a relatively small memory. Parsing the header block may also include parsing the header block into a signature block that contains a header digital signature for confirmation of the header block. The parsing may be followed by confirming a signature of the header block.

After the header block data is parsed, confirmed and stored, a confirmation may be sent to the source and, at block 608, a body block of the update may be received.

At block 610, a hash may be taken of the body block and compared to the stored hash recovered from the header block. When a digital signature of the body block fails for this or any body block, processing may continue at block 612 and the download may be abandoned. Any data received during the transaction to that point may be rolled back and the previous memory contents restored. When the digital signature confirmation is successful, processing may continue at block 614 and the body block stored in the target memory. The processor managing the update process, for example, a "second" processor 202, being that of the security module 200 (as opposed to a main processor 120 of the computer 110) may have enough information from the header block to place the data block into memory at an absolute memory location, or may place a current data block relative to a previous data block.

At block 616, data block information may be compared to that sent in the header block and if there are more data blocks to be received, a confirmation message may be sent to the source and processing continued at block 608, where another data block may be received. When, at block 616, the last data block has been received and verified, the 'yes' branch from block 616 may be taken to block 618.

At block 618, the update may be committed and the previous contents of the memory deleted. At block 620, subsequent operation may be from the updated memory of the secure device. For example, upon rebooting, calls to the BIOS may be executed from the newly updated data.

Figure 7:
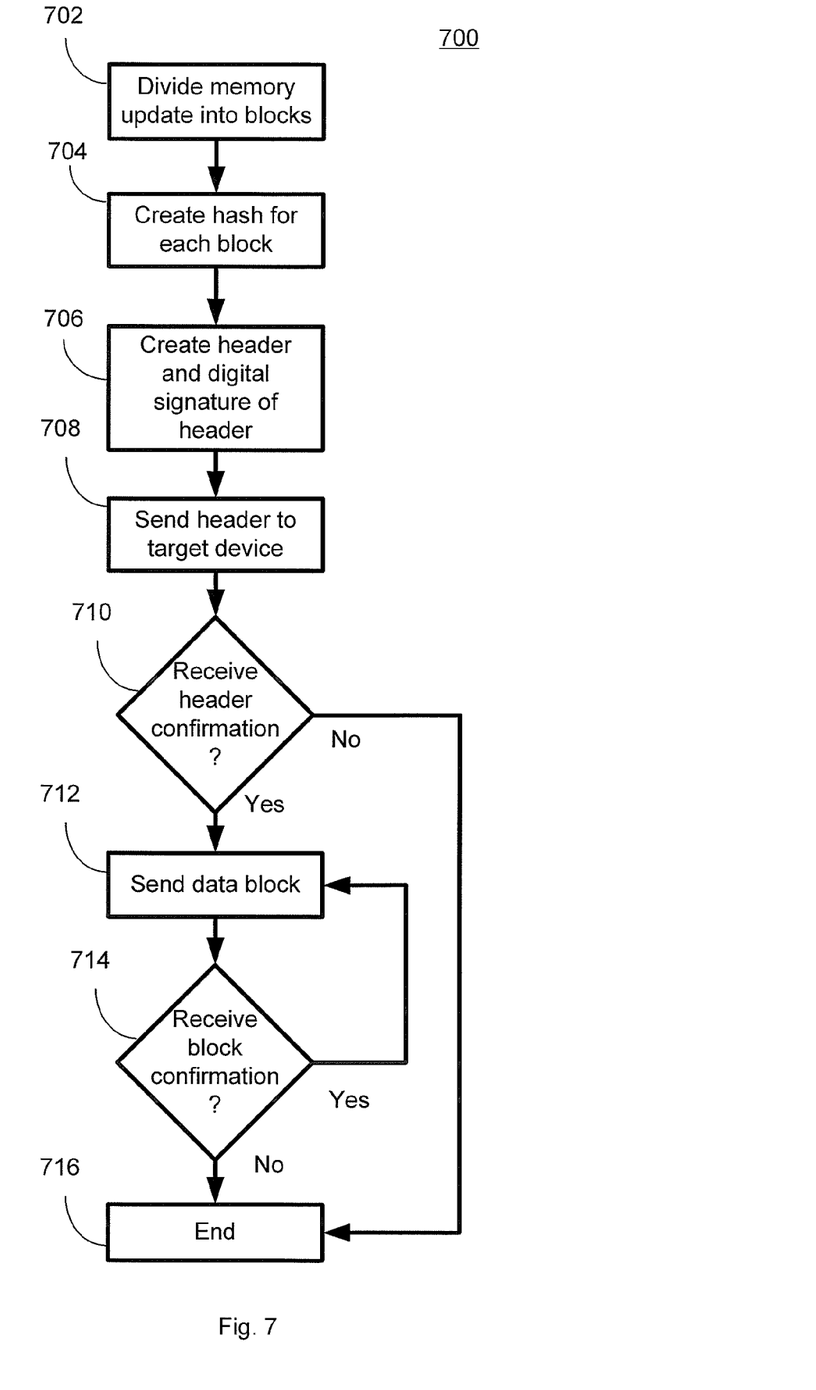
FIG. 7 is a method of preparing and sending a memory update.

FIG. 7 is a method 700 of running computer-executable instructions stored in a computer-readable medium for securely downloading a memory update to a target device, such as computer 110 of FIG. 1 or another electronic device (not depicted). The computer-readable medium may include those discussed in FIG. 1, including removable and non-removable volatile and non-volatile memory, e.g. memories 140, 152, 154, 156 of FIG. 1.

At block 702, the memory update may be divided into blocks. At block 704, a respective hash corresponding to each of the blocks may be created.

At block 706, a header 400 may be created that will be used in conjunction with downloading a memory update to the target device. The header 400 may include each respective hash that was created at block 704. For example, the header 400 may include an update hash record 408 with a hash block field 448, 450, 452 for each respective hash.

Creating the header 400 may also include creating records for the header related to management and security of the download process. For example, a memory update header record 402 may have memory update format version field 412, a signature size field 418, a total header size field 420, a memory update size field 422, and a size field for the blocks 424. Target device identifying information, such as an update metadata record 404 may be added to the header. A digital signature of the header 454 may be created and attached to the header 400 as well.

At block 708, the header 400 may be sent to the target device. At block 710, a confirmation may be received verifying that the target device identifying information and the digital signature were accepted by the target device. When the confirmation of the header 400 is received, the 'yes' branch from block 710 may be followed to block 712.

At block 712, a first block may be sent to the target device responsive to the confirmation. At block 714, responsive to a second confirmation verifying that the first block was confirmed by the target device, execution may continue by looping to block 712 and a second block may be sent to the target. Receipt of the second confirmation indicates the target was able to confirm the first block using the respective hash corresponding to the first block that was included in the header 400. This process may be followed until all data blocks are sent, at which time, the 'no' branch from block 714 may be followed to block 716 and the download process ended.

When, at block 710, no confirmation of header receipt is received, the 'no' branch from block 710 may be followed to block 716 in the process ended and the method may be abandoned.

By dividing an update into small blocks, hashing each block, and including that hash in a header, updates to a device with a limited amount of memory may be accomplished without compromising security. Individual blocks may be verified without requiring that the entire update the in memory before confirmation may begin. Similarly, managing the update as a transaction so that a failure at any point may simply be rolled back to the last previous version helps to ensure potentially critical data is not corrupted.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method of securely downloading an update to a constrained memory, the update including at least a header block and a plurality of body blocks, the method comprising:
   a) receiving a header block of the update;
   b) parsing the header block;
   c) receiving a body block of the plurality of body blocks of the update;
   d) verifying the body block by confirming a digital signature of the body block, using a processor, based at least in part on information obtained from the header block;
   e) storing the body block based on confirmation of the digital signature;
   f) repeating steps c-e for each block of the plurality of body blocks until the plurality of body blocks has been received, wherein each body block is individually verified using respective information obtained from the header block;
   g) committing the update when each of the plurality of body blocks has been received.

2. The method of claim 1, further comprising downloading the update when the act of confirming the digital signature fails for the body block.

3. The method of claim 1, further comprising operating from the update after all the body blocks have been received.

4. The method of claim 1, wherein parsing the header block comprises:
   decoding an encrypted portion of the header block; and
   confirming at least a portion of the header block.

5. The method of claim 1, further comprising confirming a signature of the header block.

6. The method of claim 1, wherein parsing the header block comprises parsing the header block into:
   an update data header having a format version, an identifier, a signature size, a signature offset, an update size, and a body block size;
   an update metadata record including an update type, an update version, a hardware identifier, a universal product identifier, and a target type;
   a signature metadata record including a total count of body blocks, and a size of each body block; and
   an update signature record having signature data for each body block.

7. The method of claim 1, wherein parsing the header block comprises parsing the header block into a signature block that contains a header digital signature for confirmation of the header block.

8. The method of claim 1, wherein committing the update comprises committing the update to a memory of a secure module of an electronic device.

9. The method of claim 1, wherein the update is one of a basic input/output system (BIOS) update and a firmware image of a security module.

10. A computer-readable storage medium having computer-executable instructions for implementing a method of securely downloading a memory update to a target device, the method comprising:
    dividing the memory update into a plurality of data blocks;
    creating a plurality of hashes, the plurality of hashes including a respective hash corresponding to each block of the plurality of blocks;
    creating a header including the plurality of hashes;
    adding a target device identifying information to the header;
    creating a digital signature of the header and attaching the digital signature to the header; and sending the header to the target device; and
    after sending the header to the target device, individually sending the plurality of data blocks to the target device, wherein at least one data block is sent based on a confirmation received from the target device for a previously sent data block.

11. The computer-readable storage medium of claim 10, further comprising:
    receiving a confirmation verifying that the target device identifying information and the digital signature were accepted by the target device.

12. The computer-readable storage medium of claim 11, wherein sending the plurality of data blocks to the target device comprises:
    sending a first block to the target device responsive to the confirmation; and
    sending a second block to the target device responsive to a second confirmation verifying that the first block was confirmed by the target device using the respective hash corresponding to the first block.

13. The computer-readable storage medium of claim 11, further comprising:
    abandoning the method responsive to a negative confirmation.

14. The computer-readable storage medium of claim 11, wherein creating the header further comprises creating fields for an update data header record having a memory update format version field, a signature size field, a total header size field, a memory update size field, and a size field for each of the blocks.

15. The computer-readable storage medium of claim 11, wherein creating the header including each respective hash comprises creating an update hash record with a hash block field for each respective hash.

16. A computer with a security module adapted to receive and verify a memory update, the security module comprising:
    a processor;
    a port for receiving the memory update having a header portion and a plurality of body block portions;
    a bus connecting the processor to the port;
    the security module coupled to the bus and having a second processor, a cryptographic module, and a secure memory storing computer-executable instructions for executing a program, the program comprising:
      a download module for receiving update blocks from the port via the bus;
      a header verification module for authenticating the header portion of the memory update;
      a storage module for storing hash values embedded in the header portion, the hash values comprising a respective hash value for corresponding body block portions of the memory update;
      a body block module configured to:
        receive the plurality of body block portions of the memory update, wherein the body block module is configured to receive a first one of the body block portions, separate from a second one of the body block portions, and
        prior to receiving the second one of the body block portions, compare a hash of the first body block portion with the respective hash value embedded in the header portion for the first body block portion and send a confirmation based on the comparison; and an activation module for operating from the memory update when all the update blocks have been received and verified by the body block module.

17. The computer of claim 16, wherein the header verification module parses the header portion into records comprising an update data header record, an update metadata record, an update signature metadata record, a hash data record, and a signature record.

18. The computer of claim 17, wherein the update metadata record comprises an update type field, an update version field, a hardware identifier, a product identifier, a platform type, and a platform version.

19. The computer of claim 17, wherein the update signature metadata record comprises a block count field, a hash algorithm identifier field, and a hash size field and wherein the hash data record includes a hash field for each update block.

20. The computer of claim 17, wherein the activation module retains an original memory update for operation when the body block module fails to verify all the update blocks.

* * * * *